United States Patent
Birchak et al.

(10) Patent No.: US 10,889,386 B2
(45) Date of Patent: Jan. 12, 2021

(54) DEVICE FOR ELECTRICALLY GROUNDING AIRCRAFT COMPONENTS MOUNTED ON A COMPOSITE SKIN FUSELAGE

(71) Applicant: HONEYWELL INTERNATIONAL INC., Morris Plains, NJ (US)

(72) Inventors: Daniel C Birchak, Gilbert, AZ (US); Christopher Thomas, Tucson, AZ (US); William F Ryan, Phoenix, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 421 days.

(21) Appl. No.: 15/150,506

(22) Filed: May 10, 2016

(65) Prior Publication Data

US 2017/0217604 A1    Aug. 3, 2017

Related U.S. Application Data

(60) Provisional application No. 62/289,967, filed on Feb. 2, 2016.

(51) Int. Cl.
*B64D 45/02* (2006.01)
(52) U.S. Cl.
CPC .................. *B64D 45/02* (2013.01)
(58) Field of Classification Search
CPC .................................................... B64D 45/02
See application file for complete search history.

(56) References Cited

U.S. PATENT DOCUMENTS

| 4,695,212 A | 9/1987 | Berecz |
| 4,755,904 A | 7/1988 | Brick |
| 7,114,900 B2 | 10/2006 | Toosky |
| 2002/0176739 A1* | 11/2002 | Goto ..................... F16B 5/0233 403/301 |
| 2005/0280032 A1* | 12/2005 | Hutter, III ................ H01R 4/04 257/202 |
| 2012/0019973 A1 | 1/2012 | Ehrmantraut et al. |
| 2014/0064873 A1 | 3/2014 | Kevin et al. |
| 2014/0134936 A1 | 5/2014 | Horner et al. |
| 2016/0016673 A1 | 1/2016 | Anderson et al. |
| 2017/0217604 A1 | 8/2017 | Birchak et al. |
| 2018/0195407 A1 | 7/2018 | Kudrna et al. |

FOREIGN PATENT DOCUMENTS

| EP | 2100811 A2 | 9/2009 |
| EP | 2441678 A2 | 4/2012 |
| GB | 2528932 A | 2/2016 |

OTHER PUBLICATIONS

Extended EP Search Report for Application No. 17151535.6-1754 dated May 9, 2017.

* cited by examiner

*Primary Examiner* — Jessica B Wong
(74) *Attorney, Agent, or Firm* — Lorenz & Kopf, LLP (57) ABSTRACT

A component mounting assembly includes a non-metallic frame, a nut plate, and a grounding strap. The non-metallic frame is adapted for mounting to an aircraft fuselage. The non-metallic frame includes an outer peripheral portion having one or more fastener openings formed therein, and extends to a first height above the outer peripheral portion. The nut plate is coupled to the outer peripheral portion and extends therefrom to a second height that is at least 50% of the first height. The grounding strap is coupled, via a threaded fastener, to the nut plate.

11 Claims, 7 Drawing Sheets

DEVICE FOR ELECTRICALLY GROUNDING AIRCRAFT COMPONENTS MOUNTED ON A COMPOSITE SKIN FUSELAGE

CROSS-REFERENCE TO RELATED APPLICATION

This application claims priority to U.S. Provisional Patent Application No. 62/289,967, filed Feb. 2, 2016, the entirety of which is incorporated herein by reference.

TECHNICAL FIELD

The present invention generally relates to electrically grounding aircraft components, and more particularly relates to a device for providing direct lightning conduction path for components mounted on a composite skin fuselage.

BACKGROUND

When certain components are mounted to the exposed outer surface of an aircraft, a grounding path may need to be provided in the event of a direct lightning strike. Such components may include metallic parts that are exposed to the external environment, and are thus susceptible to direct lightning strikes. Typically, to ground the components, one or more bonding straps are connected to direct the energy from a lightning strike away from various elements of the component and into the metallic fuselage where the high energy potential can be dissipated away.

Many modern, lightweight aircraft are constructed of non-metallic layers that are bonded together to form a single composite structure. These non-metallic layers are typically non-conductive. As such, a conductive copper mesh element is typically added as an internal layer of the composite structure. The conductive copper mesh may serve as the cathode in a grounding circuit. Bonding a component to the composite structure is typically accomplished by routing conductive bonding straps from the component that is exposed to the external environment to a metallic frame to which it is mounted. The metallic frame is grounded to the copper mesh using hardware, such as nut plates, screws, and dimpled washers, with the dimpled washers providing the final conductive path to the internal copper mesh.

As aircraft weight continues to decrease in order to improve performance, structural elements, including the mounting frames of the components exposed to the external atmosphere, are also being constructed of lighter weight, non-conductive materials. With non-conductive mounting frames, it becomes more and more desirable to be able to ground metallic parts directly to the fuselage attachment screw. This desirability increases even further if the component is attached at or near the bottom of the fuselage where it may reside in fluids that are potentially corrosive to the bonding interface over time.

Hence, there is a need for a convenient way of bonding directly to the attachment screws in contact with the fuselage's conductive mesh while avoiding the risk of long term corrosion to a bonding strap that is terminated at a contact point residing in a potentially corrosive fluid.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a component mounting assembly includes a non-metallic frame, a nut plate, and a grounding strap. The non-metallic frame is adapted for mounting to an aircraft fuselage. The non-metallic frame includes an outer peripheral portion having one or more fastener openings formed therein, and extends to a first height above the outer peripheral portion. The nut plate is coupled to the outer peripheral portion and extends therefrom to a second height that is at least 50% of the first height. The grounding strap is coupled, via a threaded fastener, to the nut plate.

In another embodiment, valve frame mounting assembly includes a non-metallic valve frame, a nut plate, and a grounding strap. The non-metallic valve frame is for an aircraft thrust recovery outflow valve, and is adapted for mounting to an aircraft fuselage. The non-metallic valve frame includes an outer peripheral portion having one or more fastener openings formed therein, and extends to a first height above the outer peripheral portion. The nut plate is coupled to the outer peripheral portion and extends therefrom to a second height that is at least 50% of the first height. The grounding strap is coupled, via a threaded fastener, to the nut plate.

In yet another embodiment, a thrust recovery outflow valve assembly that is configured to be mounted to an aircraft fuselage includes a non-metallic valve frame, an aft door, a forward door, an edge protector, a gasket, a plurality of nut plates, and a grounding strap. The non-metallic valve frame includes an outer peripheral portion that has a plurality of fastener openings formed therein, and extends to a first height above the outer peripheral portion. The aft door is rotationally mounted to a first portion of the valve frame, and the forward door is rotationally mounted to a second portion of the valve frame. The edge protector is configured to be at least partially disposed within an opening in the aircraft fuselage. The gasket is disposed between the edge protector and the valve frame. The nut plates are coupled to the outer peripheral portion and extend therefrom to a second height that is at least 50% of the first height. Each nut plate is collocated with a different one of the fastener openings. The grounding strap is coupled, via a threaded fastener, to the nut plate.

Furthermore, other desirable features and characteristics of the mounting assembly will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims.

Furthermore, there is no intention to be bound by any expressed or implied theory presented in the preceding technical field, background, brief summary, or the following detailed description. In this regard, although the preferred embodiment described herein is for a thrust recovery outflow valve for an aircraft cabin pressure control system, it will be appreciated that the embodiments could extend to various other components that may be mounted to an aircraft fuselage.

Figure 1:
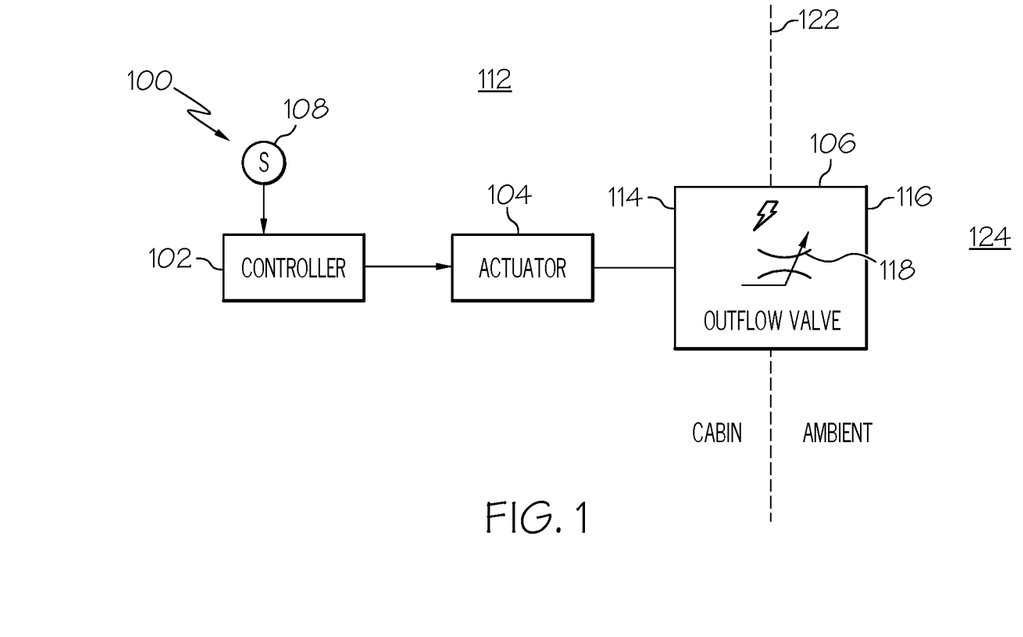
FIG. 1 depicts a simplified block diagram of an exemplary aircraft cabin pressure control system.

Turning first to FIG. 1, a simplified block diagram of an exemplary aircraft cabin pressure control system (CPCS) 100 is depicted. In the depicted embodiment, the CPCS includes a controller 102, an actuator 104, and a thrust recovery outflow valve 106. The controller 102 is operatively (e.g., electrically) coupled to the actuator 104, which is, in turn, mechanically coupled to the thrust recovery outflow valve 106. During operation of the CPCS 100, the controller 102 commands the actuator 104 to move the thrust recovery outflow valve 106 to various positions, to thereby modulate cabin pressure and/or cabin pressure rate-of-change.

It will be appreciated that the controller 102 may command the actuator 104 to move the thrust recovery outflow valve 106 in accordance with a predetermined schedule or as a function of one or more sensed parameters. In the depicted embodiment, the CPCS 100 further includes one or more cabin pressure sensors 108 (only one shown for clarity) that sense pressure within the aircraft cabin 112 and supply a cabin pressure sensor signal representative thereof to the controller 102. It will additionally be appreciated that the CPCS 100 may be implemented with various other sensors, such as one or more non-illustrated cabin temperature sensors, one or more non-illustrated cabin-to-atmosphere differential pressure sensors, one or more non-illustrated atmospheric pressure sensors, and one or more outflow valve position sensors, just to name a few.

The thrust recovery outflow valve 106 includes an inlet flow port 114, an outlet flow port 116, and an interposed valve element 118. The thrust recovery outflow valve 106 is, for example, preferably mounted on the aircraft fuselage 122 such that the inlet flow port 114 is exposed to the aircraft cabin 112 and the outlet flow port 116 is exposed to the atmosphere outside of the aircraft 124. Thus, during flight, the pressure in the aircraft cabin 112 (e.g., cabin altitude) and/or the rate of change of aircraft cabin altitude, can be controlled by positioning the valve element 118, via the actuator 104. In one specific implementation, the thrust recovery outflow valve 106 is located in the rear underbelly of the aircraft proximate the tail. Moreover, in some implementations, the thrust recovery outflow valve 106 may be positioned so that additional forward thrust is supplied to the aircraft when pressurized air is venting from the aircraft cabin 112 to the atmosphere 124 outside the aircraft. It will be appreciated that the thrust recovery outflow valve 106 may be variously configured to implement this functionality. One particular physical implementation is depicted in FIG. 2, and with reference thereto will now be described.

Figure 2:
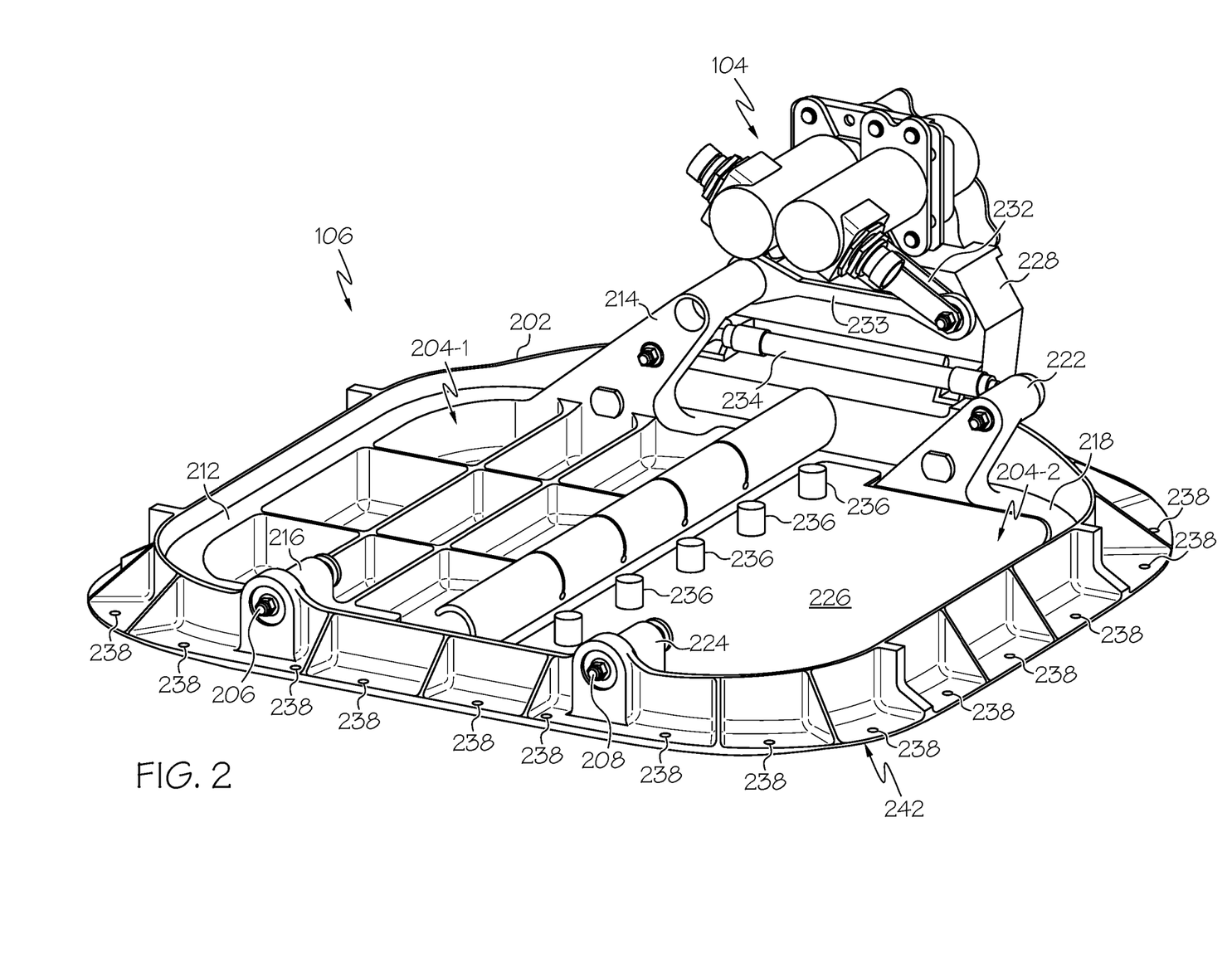
FIG. 2 depicts an isometric view of one embodiment of a multi-door thrust recovery outflow valve that may be used in the system of FIG. 1.

The thrust recovery outflow valve 106 depicted in FIG. 2 is a multi-door thrust recovery outflow valve. Thus, as will now be described, the valve element 118 is implemented using a plurality of doors. The thrust recovery outflow valve 106 includes a frame 202, an aft door 204-1 rotationally mounted to a first portion of frame 202 (indicated in FIG. 2 at aft pivot 206), and a forward door 204-2 rotationally mounted to a second portion of frame 202 (indicated in FIG. 2 at forward pivot 208). The aft door 204-1 includes a main, plate-like body 212 and first and second arms 214 and 216, which extend outwardly from the main body 212 proximate the aft pivot 206. Similarly, the forward door 204-2 includes a main, plate like body 218 and first and second arms 222 and 224, which extend from the main body 218 proximate the forward pivot 208. In the depicted embodiment shown in FIG. 2, a backing plate 226 is affixed (e.g., bolted) to the body 218 of the forward door 204-2.

In the illustrated exemplary embodiment, the actuator 104 is implemented using first and second electrical drive motors, which are each mounted to an actuator mount 228. The actuator 104 is mechanically coupled to the first arm 214 of the aft door 204-1 via a master linkage 232 that is connected to the first arm 214 of the aft door 204-1. In addition, the first arm 214 of the aft door 204-1 is mechanically linked to the first arm 222 of the forward door 204-2 via a first slave link 234. Together, the first arms 214, 222, and the slave link 234 form a linkage that enables the actuator 104 to simultaneously move the aft door 204-1 and the forward door 204-2 between a closed position and an open or cruise position. If desired, and as FIG. 2 further depicts, the thrust recovery outflow valve 106 may also be provided with one or more rows of noise abatement projections or pegs 236, which extend outwardly from the backing plate 226 near the inner sealing edge of the aft door 204-1. When pressurized air flows through the thrust recovery outflow valve 106 in the cruise position, these noise abatement pegs 236 condition the pressurized airflow through the thrust recovery outflow valve 106 to help minimize tonal noise production.

Figure 3:
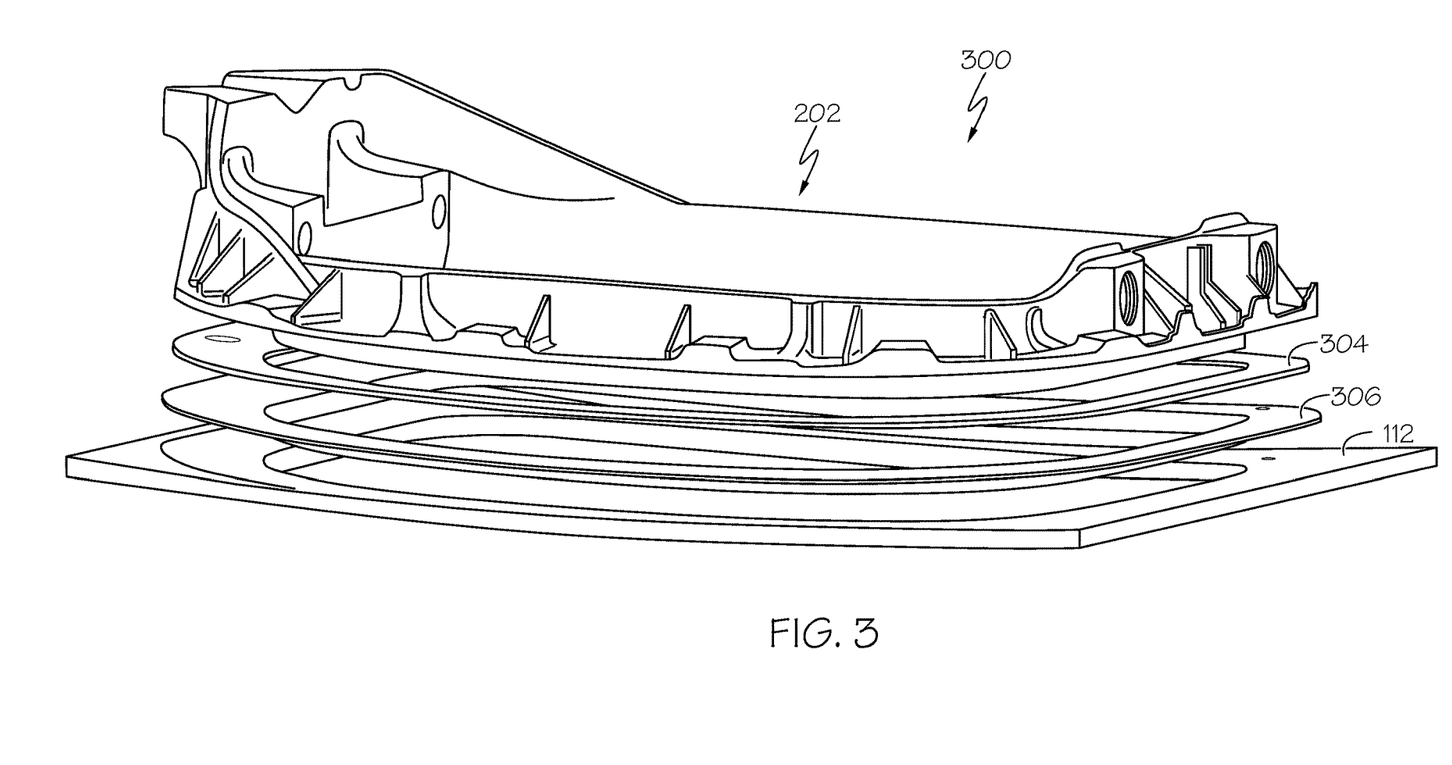
FIG. 3 depicts one example of a component-to-fuselage mounting arrangement for the outflow valve depicted in FIG. 2.

The frame 202 may be made of any one of numerous types of metallic or non-metallic materials. In one particular preferred embodiment, the frame 202 is made of a thermoplastic polymer, such as polyether ether ketone (PEEK). Regardless of the particular material, the frame 202 is configured to be mounted to an aircraft fuselage. For example, and as previously noted, the frame 202 may be mounted through a wall of an aircraft fuselage. To do so, and as FIG. 2 further depicts, the frame includes a plurality of fastener openings 238 formed in an outer peripheral portion 242 of the frame via non-depicted fastening hardware. More specifically, and with reference now to FIG. 3, the frame 202 is preferably mounted, together with a gasket 304 and an edge protector 306, onto the fuselage 112, via non-depicted fastening hardware. As will now be described, at least some of the fastening hardware is configured to more easily and readily ground various components of the outflow valve to the fuselage 112. Before doing so, however, it is noted that although the depicted mounting arrangement 300 is for the valve frame 202 of an outflow valve 106, the mounting arrangement 100 may alternatively be for numerous other non-metallic frames that are fuselage mounted and need to be grounded.

Figure 4:
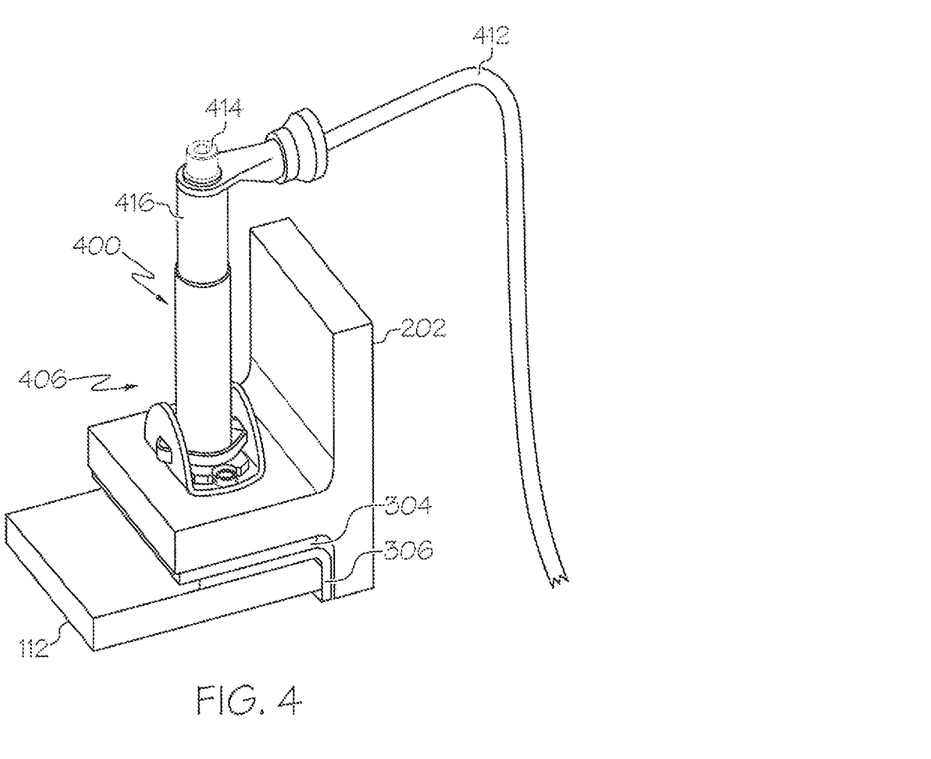
FIGS. 4 and 5 close-up isometric and cross-section views, respectively, of a portion of the mounting arrangement of FIG. 3.
Figure 5:
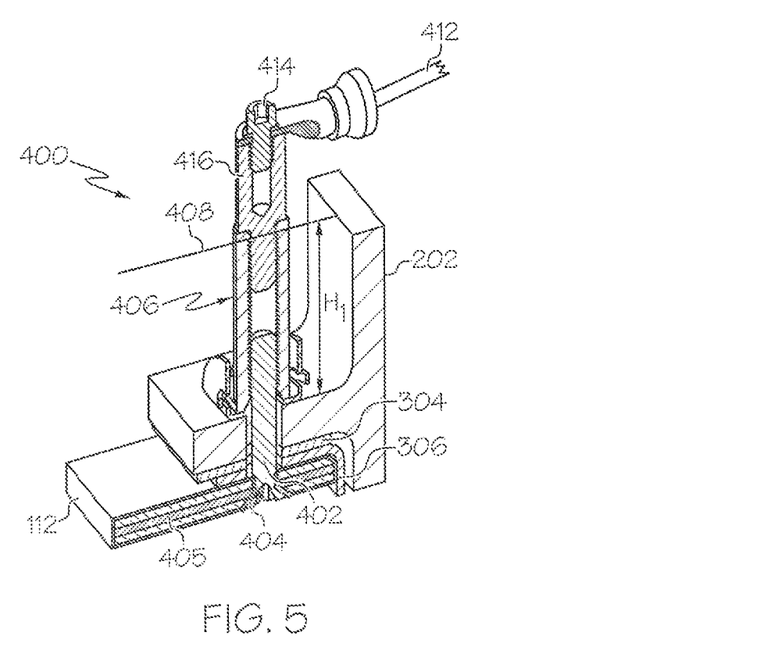

With reference now to FIGS. 4 and 5, close-up isometric and cross-section views, respectively, of a portion of the mounting arrangement 300 is depicted and illustrates, in addition to the valve frame 202, gasket 304, edge protector 306, and fuselage 112, an embodiment of ground-facilitating mounting hardware 400. The mounting hardware 400 includes a component attachment screw 402, a dimpled washer 404, and a nut plate 406. The attachment screw 402 extends through an opening in the fuselage and is electrically connected, via the dimple washer 404, to a conductive copper mesh 405 that forms part of the fuselage 112. The attachment screw 402 also extends through openings in the edge protector 306, the gasket 304, and the valve frame 202, and is threaded into the nut plate 406.

A line 408 that extends perpendicularly from the top of the valve frame 202 and parallel to the fuselage 112 defines what is referred to herein as the frame waterline. The depicted nut plate 406, unlike nut plates presently known in the art, extends from the valve frame 202 to a height ($H_1$) that is preferably above the frame waterline 408. This allows a grounding strap 412 to be connected, via a threaded strap screw 414, directly to the nut plate 406 (which has like threads). Preferably, the nut plate 406 height is sufficient to ensure the grounding strap 412 remains above the frame waterline 408 and to ensure that the attachment screw 402 will not contact the strap screw 414 from the opposite end. Such contact may not allow either or both the attachment screw 402 and the strap screw 414 to be properly torqued.

In other embodiments, the nut plate 406 may extend to a height that is at or slightly below the frame waterline 408. Preferably, the height will be within at least 50% of the frame waterline 408. In such embodiments, as FIGS. 4 and 5 also depict, an electrically conductive connector rod 416, having external threads on one end, and internal threads on the other, may be used to connect the grounding strap 412 to the nut plate 406. The conductive rod 416 extends the connection point of the grounding strap above frame waterline 408, to any height necessary to interface with the valve parts that are being grounded. Similar to the above, the nut plate 406 height would still be sufficient to ensure that the attachment screw 402 will not contact the strap screw 414 from the opposite end.

Figure 6:
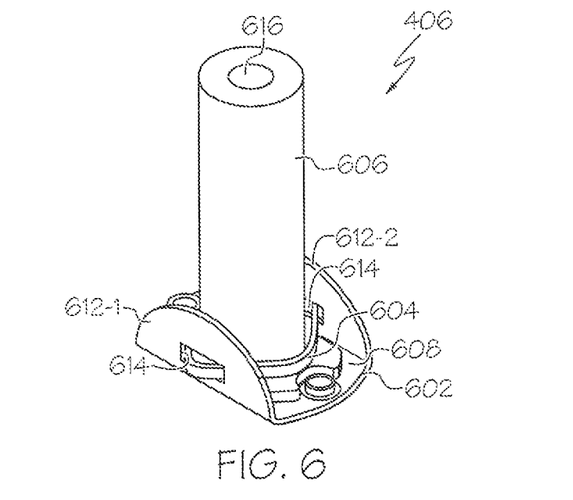
FIGS. 6-8 depict isometric, top, and cross section views, respectively, of an embodiment of a nut plate that may be used to implement the mounting arrangement.
Figure 7:
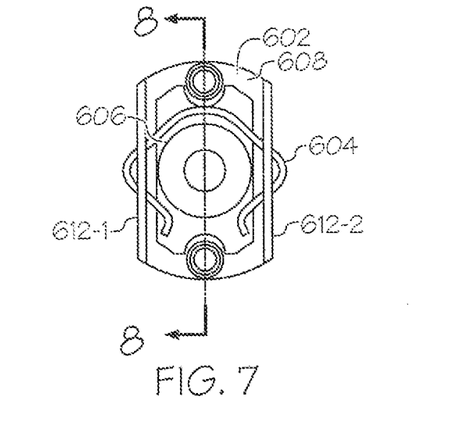
Figure 8:
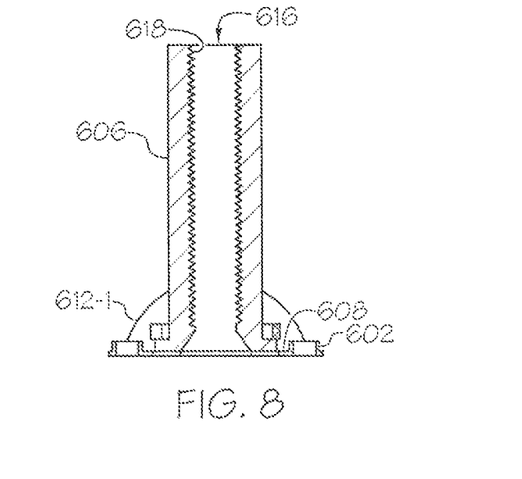

Turning now to FIGS. 6-8, although the nut plate 406 may be variously configured and implemented, in the depicted embodiment the nut plate 406 includes a base plate 602, a clip 604, and a nut 606. The base plate 602 includes a main section 608 and two clip sections 612 (612-1, 612-2) that extend perpendicularly therefrom. Each clip section 612 has a clip slot 614 formed therein, and opposing portions of the clip 604 extend through a different one of the clip slots 614.

The nut 406 is disposed on the base plate 602, and is held in place by the clip 604, though it may float somewhat from the center in any direction. The nut 606 extends perpendicularly from the base plate 602, and parallel to the clip sections 612, to the desired height (as mentioned above). The nut 606 is formed of an electrically conductive material, and has an opening 616 formed there through to define an inner surface 618. At least a portion of the inner surface 618 has threads formed thereon to mate with the attachment screw 402 and the strap screw 414.

Figure 9:
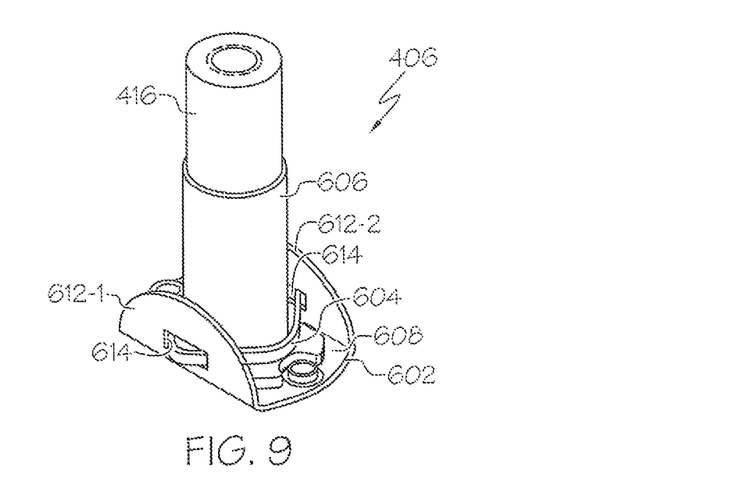
FIGS. 9-11 depict isometric, top, and cross section views, respectively, of another embodiment of a nut plate that may be used to implement the mounting arrangement.
Figure 10:
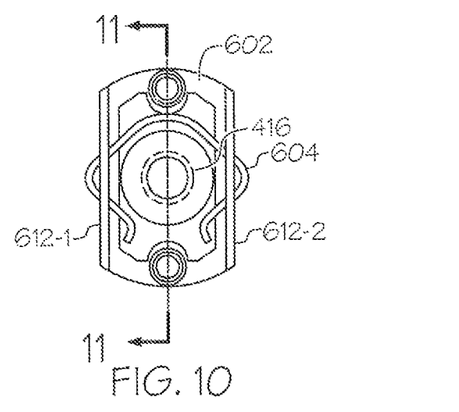
Figure 11:
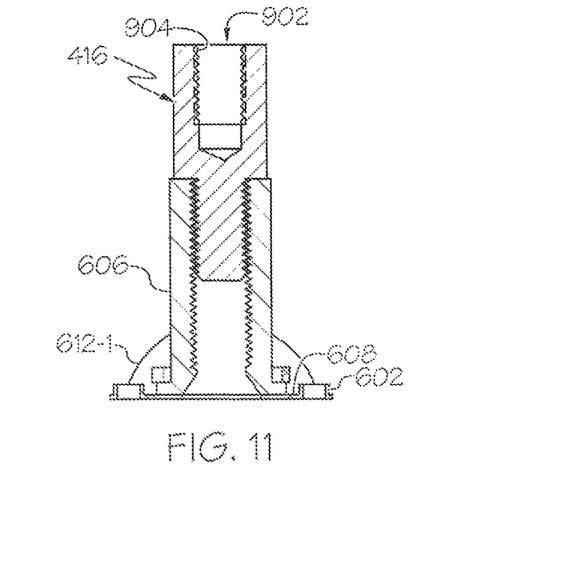

In an alternative embodiment, as described above and as depicted more clearly in FIGS. 7-9, the conductive rod 416 could be threaded into the threaded opening 616 in the nut 606, via threads that are formed on the outer surface thereof. Like the nut 606, the conductive rod 416 is formed of an electrically conductive material, and has an opening 902 formed therein to define an inner surface 904, but the opening 902 does not extend through the conductive rod 416. At least a portion of the inner surface 904 has threads formed thereon to mate with the strap screw 414.

In both of the embodiments described above, the nut 606 may be either fixed or floating. In either case, the nut plates 406, when mounted on a metallic structure, are permanently attached to metallic structures via the use of rivets or screws. However, when the nut plates 406 are mounted on a non-metallic/composite structure, the material properties of the structure no longer lend themselves to such permanent attachment without the use of additional parts like mechanical or bonded-in inserts prior to installation of the rivets or screws. This adds complexity and cost and thus negates some of the manufacturing benefits that were being sought in the design. While there are nut plates that can be attached using adhesives, the adhesive bond lines are not considered sufficiently reliable.

Figure 12:
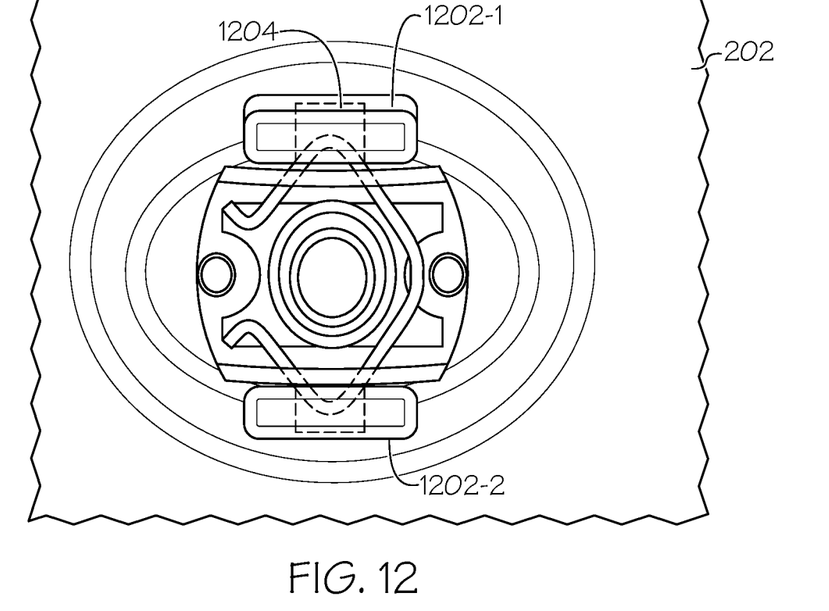
FIGS. 12 and 13 depict isometric and top views, respectively, of a self-retaining nut plate configuration.
Figure 13:
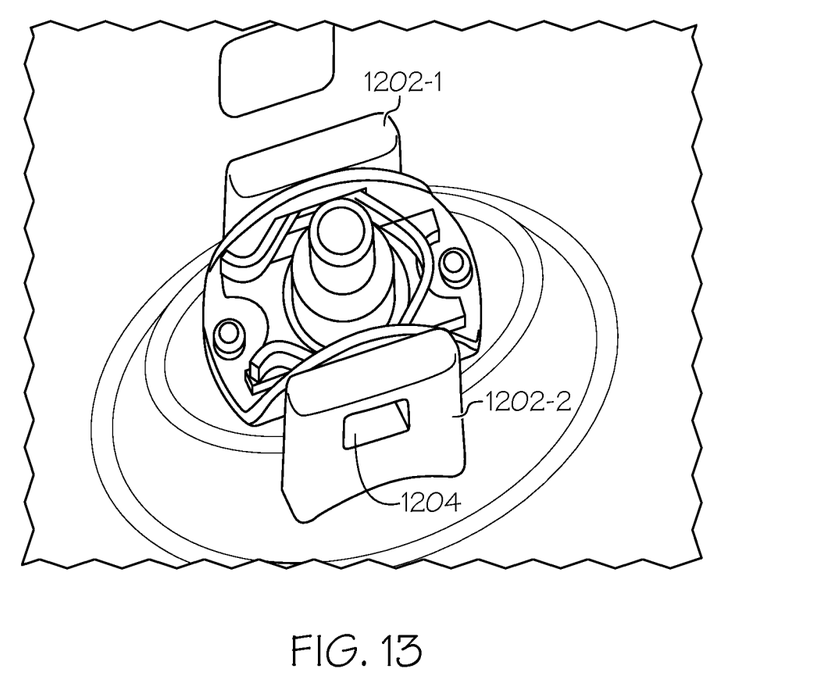

In view of the foregoing, and as depicted in FIGS. 12 and 13, in some embodiments the valve frame 202 is molded to include a pair of parallel anti-rotation features 1202 (1202-1, 1202-2). The anti-rotation features 1202 are spaced apart from each other to accept the width of the nut plate 406, and each includes a retention slot 1204, created using a single post-mold plunge cut. The portions of the clip 604 that extend through the clip slots 614 also extend into the retention slots 1204. As a result, the nut 606 is retained to the base plate 602, while also retaining the entire nut plate 416 to the valve frame 202.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A component mounting assembly, comprising:
a non-metallic frame adapted for mounting to an aircraft fuselage, the frame including an outer peripheral portion having one or more fastener openings formed therein, the frame further including a wall that extends perpendicular to the outer peripheral portion to a first height above the outer peripheral portion;
a nut plate coupled to the outer peripheral portion and extending therefrom to a second height that is at least 50% of the first height, the nut plate having a first end, a second end, and an inner surface extending between the first end and the second end, the inner surface having threads formed on the inner surface thereof;
a threaded attachment screw extending through one of the fastener openings and into the first end of the nut plate, the threaded attachment screw threaded into the nut plate and mating with the threads formed on the inner surface of the nut plate;
a connector rod having external threads formed on one end thereof and internal threads formed on an opposite end, the connector rod extending into the second end of the nut plate and the external threads mating with the threads formed on the inner surface of the nut plate;
a threaded fastener in mating threaded engagement with the internal threads formed on the second end of the connector rod; and
a grounding strap disposed between, and engaging, the threaded fastener and the connector rod.

2. The assembly of claim 1, wherein the connector rod, the nut plate, and the threaded fastener are all formed of electrically conductive material.

3. The assembly of claim 1, wherein the nut plate comprises:
a base plate, the base plate including a main section and two clip sections, the main section mounted on the outer peripheral portion, the clip sections extending perpendicularly from the main section, each clip section having a clip slot formed therein;
a nut disposed on the base plate and extending perpendicularly therefrom to the second height and having an opening formed there through to define the nut plate inner surface, the nut disposed parallel to the clip sections, at least a portion of the inner surface having the nut plate threads formed thereon to mate the threaded fastener; and
a clip at least partially surrounding and engaging a portion of the nut, opposing portions of the clip extending through a different one of the clip slots.

4. The assembly of claim 3, wherein the frame further comprises:
a pair of parallel anti-rotation features extending from the outer peripheral portion and spaced apart from each other to define a gap in which the base plate is disposed, each anti-rotation feature including a retention slot into which the portions of the clip that extend through the clip slots also extend.

5. The assembly of claim 1, further comprising:
an aft door rotationally mounted to a first portion of frame;
a forward door rotationally mounted to a second portion of frame;
an edge protector configured to be at least partially disposed within an opening in the aircraft fuselage; and
a gasket disposed between the edge protector and the valve frame.

6. A component mounting assembly, comprising:
a non-metallic frame adapted for mounting to an aircraft, the frame including an outer peripheral portion having one or more fastener openings formed therein, the frame further including a wall that extends perpendicular to the outer peripheral portion to a first height above the outer peripheral portion;
a nut plate coupled to the outer peripheral portion and extending therefrom to a second height that is at least 50% of the first height;
a grounding strap coupled to the nut plate via a threaded fastener; and
a connector rod coupled, via threads, between the threaded fastener and the nut plate.

7. The assembly of claim 6, wherein:
the connector rod has external threads on one end thereof and internal threads on an opposite end;
the external threads mate with threads formed on an inner surface of the nut plate; and
the internal threads mate with the threaded fastener.

8. The assembly of claim 7, wherein the connector rod, the nut plate, and the threaded fastener are all formed of electrically conductive material.

9. The assembly of claim 6, further comprising:
a threaded attachment screw extending through one of the fastener openings and threaded into the nut plate.

10. The assembly of claim 6, wherein the nut plate comprises:
a base plate, the base plate including a main section and two clip sections, the main section mounted on the outer peripheral portion, the clip sections extending perpendicularly from the main section, each clip section having a clip slot formed therein;
a nut disposed on the base plate and extending perpendicularly therefrom to the second height and having an opening formed there through to define an inner surface, the nut disposed parallel to the clip sections, at least a portion of the inner surface having threads formed thereon to mate the threaded fastener; and
a clip at least partially surrounding and engaging a portion of the nut, opposing portions of the clip extending through a different one of the clip slots.

11. The assembly of claim 10, wherein the frame further comprises:
a pair of parallel anti-rotation features extending from the outer peripheral portion and spaced apart from each other to define a gap in which the base plate is disposed, each anti-rotation feature including a retention slot into which the portions of the clip that extend through the clip slots also extend.

* * * * *